(12) United States Patent
Juzak et al.

(10) Patent No.: US 10,837,586 B2
(45) Date of Patent: Nov. 17, 2020

(54) VIBRATION ISOLATING INSERT FOR A PIPE CLIP

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. Van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 16/463,013

(22) PCT Filed: Nov. 27, 2017

(86) PCT No.: PCT/NL2017/050784
§ 371 (c)(1),
(2) Date: May 22, 2019

(87) PCT Pub. No.: WO2018/101817
PCT Pub. Date: Jun. 7, 2018

(65) Prior Publication Data
US 2019/0316722 A1 Oct. 17, 2019

(30) Foreign Application Priority Data
Nov. 30, 2016 (NL) .................................. 2017895

(51) Int. Cl.
*F16L 55/035* (2006.01)
*F16L 3/123* (2006.01)
(Continued)

(52) U.S. Cl.
CPC ............ *F16L 55/035* (2013.01); *B29C 48/12* (2019.02); *B29C 48/16* (2019.02); *F16L 3/1233* (2013.01)

(58) Field of Classification Search
CPC ....... F16L 55/035; F16L 3/1233; F16L 3/123; F16L 3/1211; F16L 3/1222; F16L 3/1236; F16L 3/14
(Continued)

(56) References Cited

U.S. PATENT DOCUMENTS 2,387,295 A * 10/1945 Archibald ............. F16L 3/1233
248/74.3
3,856,245 A * 12/1974 Byerly ...................... F16L 3/12
248/74.3
(Continued)

FOREIGN PATENT DOCUMENTS

DE 2311057 A1 9/1974
DE 102007052559 A1 5/2009
(Continued)

OTHER PUBLICATIONS

NL Search Report for NL 2017895, dated Jul. 19, 2017.
International Search Report and Written Opinion for PCT/NL2017/050784, dated Feb. 19, 2018.

*Primary Examiner* — Aaron M Dunwoody
(74) *Attorney, Agent, or Firm* — Hoffmann & Baron, LLP

(57) ABSTRACT

A vibration isolating insert for a pipe clip includes an elongate strip having a pipe facing side, which in use faces the outer surface of the pipe, and opposite thereto a pipe clip facing side, which in use faces an inner side of the pipe clip body. The vibration isolating insert includes gripping formations connected to the strip at lateral side portions and extending towards the pipe clip facing side and in use grip over the lateral edges of the pipe clip body. The vibration isolating insert includes a framework and a vibration isolating lining made of a softer material different from the material of the framework, where the framework is formed of a polymeric material. The framework includes a strip shaped web, that reinforces the elongate strip, and lateral
(Continued)

reinforcing members connected to the web on either lateral side of the web and reinforcing the gripping formations.

11 Claims, 3 Drawing Sheets

(51) Int. Cl.
*B29C 48/16* (2019.01)
*B29C 48/12* (2019.01)

(58) Field of Classification Search
USPC .................................. 285/49; 248/74.2, 74.3
See application file for complete search history.

(56) References Cited

U.S. PATENT DOCUMENTS

| | | | | |
|---|---|---|---|---|
| 3,995,795 A | * | 12/1976 | Hogan | F16L 3/1233 248/68.1 |
| 4,189,807 A | * | 2/1980 | Byerly | F16L 3/1233 174/40 CC |
| 4,441,677 A | * | 4/1984 | Byerly | F16L 3/1233 24/16 PB |
| 5,384,936 A | * | 1/1995 | Van Walraven | F16L 3/12 24/279 |
| 5,647,564 A | * | 7/1997 | Van Walraven | F16L 55/035 248/60 |
| 2009/0026766 A1 | * | 1/2009 | Van Walraven | F16L 3/1016 285/420 |
| 2009/0314904 A1 | * | 12/2009 | Van Walraven | F16L 55/035 248/74.1 |
| 2011/0024579 A1 | * | 2/2011 | Cesarino | B60R 16/0215 248/75 |
| 2018/0031149 A1 | * | 2/2018 | Van Der Mik | F16L 3/1075 |

FOREIGN PATENT DOCUMENTS

| | | |
|---|---|---|
| EP | 2133617 A1 | 12/2009 |
| WO | 2016/056895 A2 | 4/2016 |

* cited by examiner

VIBRATION ISOLATING INSERT FOR A PIPE CLIP

CROSS-REFERENCE TO RELATED APPLICATIONS

This application is the National Stage of International Application No. PCT/NL2017/050784, filed Nov. 27, 2017, which claims the benefit of Netherlands Application No. NL 2017895, filed Nov. 30, 2016, the contents of which is incorporated by reference herein.

FIELD OF THE INVENTION

The invention relates to a vibration isolating insert for a pipe clip, the vibration isolating insert being adapted to be arranged on a substantially annular pipe clip body and ultimately—in use—to be positioned between the outer surface of a pipe and the pipe clip body. The vibration isolating insert comprises an elongate strip, said strip having a pipe facing side, which in use faces the outer surface of the pipe, and opposite thereto a pipe clip facing side, which in use faces an inner side of the pipe clip body. The vibration isolating insert furthermore comprises gripping formations connected to the strip at lateral side portions thereof and extending towards the pipe clip facing side and in use grip over the respective lateral edges of the pipe clip body. The vibration isolating insert comprises a framework and a vibration isolating lining made of a softer material different from the material of the framework.

BACKGROUND OF THE INVENTION

EP 2 133 617 discloses a vibration isolating insert for a pipe clip. This known insert has a metal reinforcing profile embedded in vibration isolating lining. The metal reinforcing profile is made of sheet metal. In order to make the reinforcing profile bendable such that it can be fitted in the pipe clip body, longitudinally distributed cutouts have to be made from the lateral side towards the centre. This known insert has the disadvantage that it is complex to manufacture. In particular making the metal reinforcing profile is labour-intensive.

SUMMARY OF THE INVENTION

The present invention has for an object to provide a reinforced vibration isolating insert which is more efficiently manufactured.

This object is achieved by a vibration isolating insert according to the present invention, wherein the framework is a profiled section element formed of a polymeric material, said framework comprising a strip shaped web, that reinforces the elongate strip, and lateral reinforcing members connected to the web on either lateral side of the web and reinforcing the gripping formations, and wherein the framework furthermore comprises at least one living hinge defining a pivot axis parallel to the longitudinal axis of the insert and allowing at least one of the gripping formations to swivel around said pivot axis to increase and decrease the distance between the gripping formations during arrangement of the insert on a pipe clip body.

The vibration isolating insert according to the invention is preferably made by extrusion of a profile, wherein the framework and the lining are co-extruded from two different polymeric materials, and wherein the extruded profile is cut to length to fit in the pipe clip body.

Another option is to make the vibration isolating insert according to the invention by injection moulding, in particular 2K injection moulding.

The vibration isolating insert according to the invention provides through the framework a relatively stiff insert that is able to withstand forces due to shifting of a pipe through the pipe clip during installation. On the other hand, the film hinges provide enough flexibility in the insert such that the insert can be easily arranged in a pipe clip.

In a preferred embodiment the lateral reinforcing members are each pivotably connected to the web by living hinges formed at the lateral sides of the web. This feature allows that the strip with the web can remain undeformed, while the gripping formation with their respective lateral reinforcing members can swivel outwardly so as to create enough space to insert the pipe clip body between the gripping formations.

In a further preferred embodiment the vibration isolating lining is made of a polymeric material that is softer than the polymeric material of which the framework is made.

In a possible embodiment of the invention the vibration isolating lining is made of an elastomeric material.

In a possible embodiment of the invention the framework is made of an elastomeric material. This elastomeric material is harder and stiffer than the material of which the vibration isolating lining is made. Such an elastomeric framework provides enough flexibility to arrange the insert in a substantially annular form in a pipe clip, without the need to provide cut outs in the web of the framework to allow bending, while at the same time the framework provides sufficient structural stiffness and hardness to the insert to resist deformation due to installation of a pipe in the pipe clips in which these inserts are arranged.

Another possible material to make the the framework from is PVC. This PVC provides sufficient hardness and rigidity to resist movement forces of the pipe with respect to the pipe clip due to installation of a pipe in the pipe clip in which the insert is arranged.

In a preferred embodiment of the invention the framework comprises a longitudinal rib formed on the pipe facing side of each lateral reinforcing member. The longitudinal rib, which forms an integral part of the framework provides a lever connected to the gripping formation, which lever can be used to pivot the gripping formation outwards and inwards. During arranging the insert in the pipe clip body the longitudinal ribs can be pinched towards each other such that the gripping formations are pivoted outwardly whereby more space between the gripping formations is created. The gripping formations can then be moved beyond the lateral edges of the pipe clip body after which the gripping formations can move inwardly again to grip around the lateral edges of the pipe clip body.

During tightening the pipe clip around a pipe the pipe presses on the longitudinal ribs and these are shaped such that said pressure forces the ribs outwardly. Through the lever mechanism the gripping formations are then forced inwards and grip more tightly around the lateral edges of the pipe clip body. Thereby a better fixation of the insert in the pipe clip body is achieved which prevents that the insert is forced out of the pipe clip body during installation work, for example when the insert is subjected to axial forces by the pipe.

In a possible embodiment one or more longitudinal intermediate ribs made of the softer lining material are formed on the pipe facing side of the strip between the longitudinal ribs on the lateral reinforcing members. Preferably the intermediate ribs have a height smaller than the ribs on the lateral reinforcing members. When the pipe clip is tightened around the pipe, the longitudinal ribs of the respective lateral reinforcing members pivot due to the pressure, whereby at some point the pipe surface engages the softer intermediate ribs, thus the better isolating part of the composite profile. The softer material will improve the isolating performance and increase the grip on the pipe.

In a further embodiment the pipe clip facing side of the framework is entirely covered with the softer lining material. This ensures that the pipe clip body, which is usually a metal part, is only in contact with the softer lining material. Thereby vibrations that are possibly transferred from the pipe to the harder and more rigid framework of the insert, will not be transferred to the pipe clip body, or vice versa.

The invention also relates to a method for manufacturing a vibration isolating insert according to claim 1, wherein the insert is made by extrusion of a profile, wherein the framework and the lining are co-extruded from two different polymeric materials, and wherein the extruded profile is cut to length to fit in the pipe clip body.

The invention will be further elucidated in the following detailed description with reference to the drawings.

DETAILED DESCRIPTION OF THE INVENTION

Figure 1:
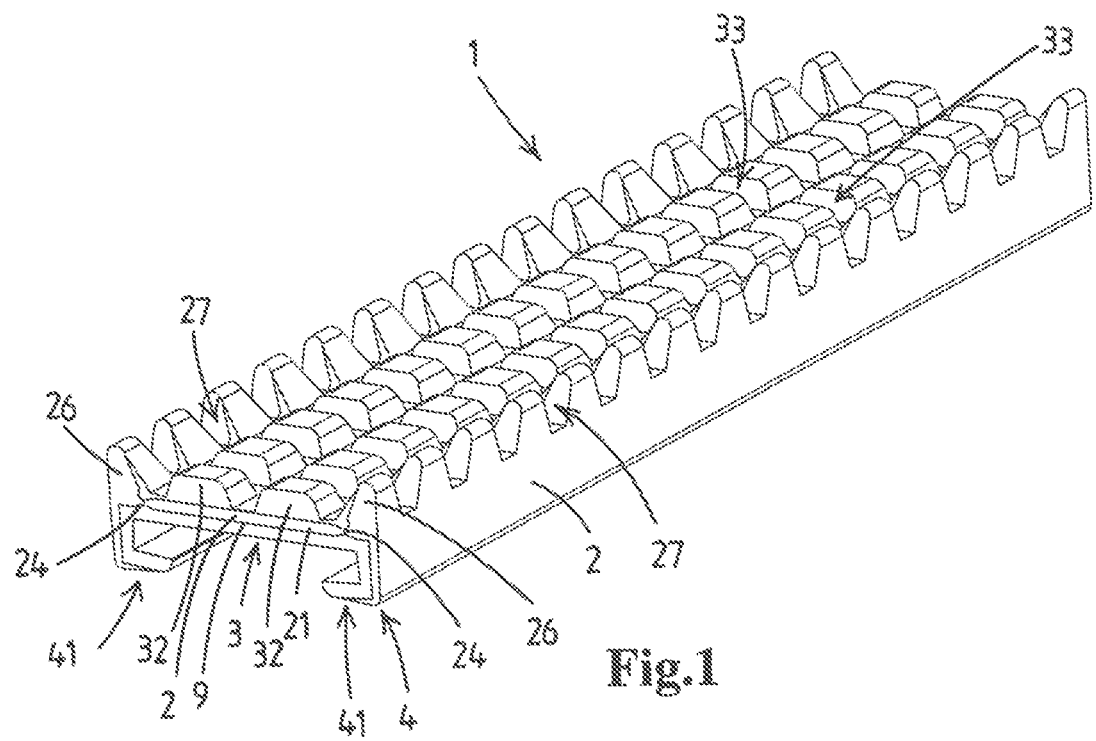
FIG. 1 shows a view in perspective of an embodiment of a vibration isolating insert according to the invention.

In FIG. 1 is shown a vibration isolating insert 1 for a pipe clip in a straight unloaded state. The vibration isolating insert 1 in this particular embodiment is a composite profiled sectioned element made of two different polymeric materials.

Figure 2:
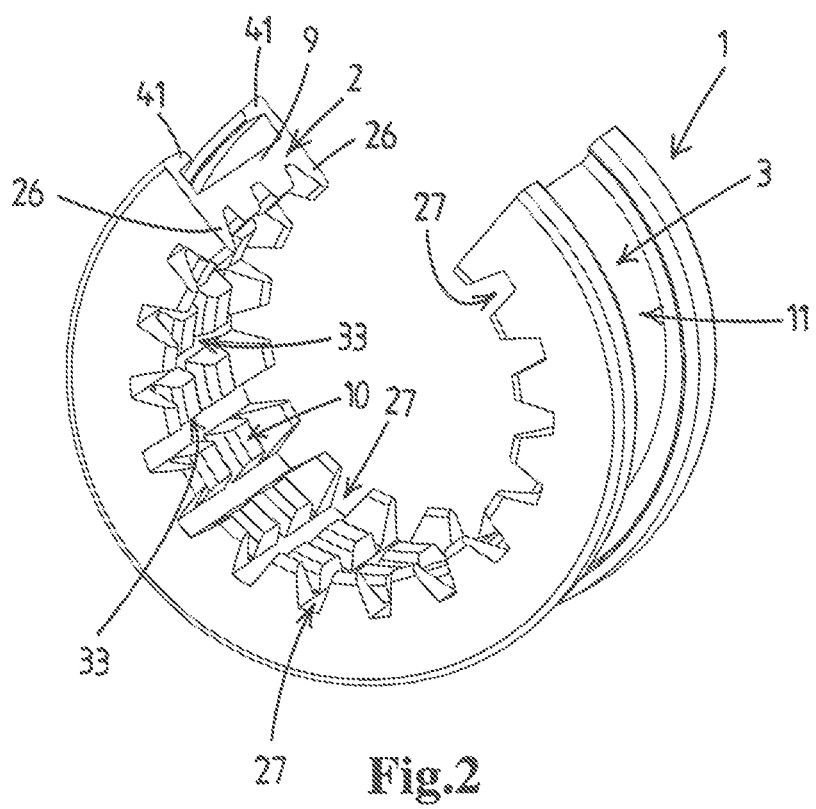
FIG. 2 shows the vibration isolating insert of FIG. 1 in a curved state in which it will be arranged in a pipe clip body.

In FIG. 2 the vibration isolating insert 1 is shown in a loaded bent state in which it is arranged in a pipe clip body. The insert 1 comprises an elongate strip 9 which has a pipe facing side 10, which in use faces the outer surface of a pipe, and opposite thereto a pipe clip facing side 11, which in use faces an inner side of a substantially annular pipe clip body.

A profiled sectioned element 1 as is shown in FIG. 1 can be manufactured by co-extrusion. Another option is to form the profiled sectioned element by means of 2K injection moulding.

The vibration isolating insert 1 is a composite body comprising a framework 2 and a vibration isolating lining 3. The framework 2 is flexible but is more rigid and harder than the vibration isolating lining 3. The material of the framework 2 has a lower friction coefficient than the material of the vibration isolating lining 3.

The vibration isolating lining 3 may be formed of a soft elastomeric material such as rubber.

In a preferred embodiment of the vibration isolating insert 1, the framework 2 is formed of an elastomeric material which is harder, and stiffer than the elastomeric material of the vibration isolating lining 3. Such an elastomeric framework provides enough flexibility to arrange the insert 1 in a substantially annular form in a pipe clip, without the need to provide cut outs in the web of the framework to allow bending. At the same time the framework 2 made of the harder elastomer provides sufficient structural stiffness and hardness to the insert to resist deformation due to installation of a pipe in the pipe clips in which these inserts are arranged.

In another embodiment of the vibration isolating insert 1, the framework 2 may be made of a plastic material. In particular a PVC material is envisaged as a suitable plastic material, because it provides sufficient hardness and stiffness to the insert 1 to resist movement forces of the pipe with respect to the pipe clip.

Figure 3:
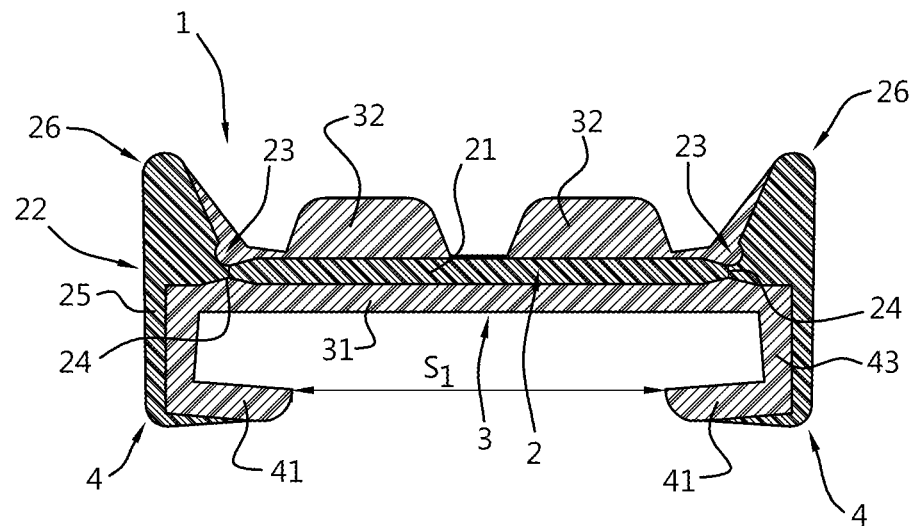
FIG. 3 shows a cross sectional view of the vibration isolating insert of FIG. 1.

As can be seen best in the cross sectional view of FIG. 3, the framework 2 itself can be considered as a profiled section element formed of a polymeric material. The framework 2 generally has an H-shape that comprises a strip shaped web 21 and two lateral portions 22 that are located on the lateral sides of the web 21 and are connected thereto. The connection between the web 21 and the respective lateral portions 22 is formed by respective hinging portions 23, which are encircled in FIG. 3.

The hinging portions 23 extend longitudinally and include a living hinge 24 between the web 21 and the associated lateral portion 22. The living hinge 24 defines a pivot axis that extends in the longitudinal direction of the vibration isolating insert 1. The living hinge 24 is a thinner section in the framework 2 at the location where the lateral portion 22 adjoins the web 21.

The vibration isolating insert 1 has gripping formations 4 which are configured and arranged to grip around the lateral edges 51 of the pipe clip body 5. The pipe clip body 5 is usually an annular strip-like body formed out of sheet metal. As is well known in the art of pipe clips, the pipe clip body 5 may comprise a single body which maybe arranged around a pipe and closed tightened with a screw. However, as is also known in the art, the pipe clip body 5 may just as well comprise two semi-circular pipe clip halves which can be tigthened with respect to each other and around a pipe with one or more screws.

The gripping formations 4, include each a lateral reinforcement member 25 which form part of the lateral portions 22 of the framework 2. In the embodiment shown these lateral reinforcement members 25 are formed as an angled member.

The inner side of the lateral reinforcement members 25 is lined with a vibration isolating material. Also the side of the web 21 and of the hinge portion 23 that in use faces the pipe clip body is lined with a vibration isolating material. Thus one integral vibration isolating lining 31 is formed covering the surfaces of web 21, hinges 24 and lateral reinforcement members 25 facing the pipe clip body. Thus the transfer of vibrations from the pipe clip body 5 to the framework 2 of the vibration isolating insert 1 and vice versa can be reduced considerably or even entirely prevented.

On the pipe facing side 10 of each lateral reinforcing member 25 a longitudinal rib 26 is formed. This longitudinal rib 26 may be formed with transverse cutouts 27 as is shown in FIGS. 1 and 2. These cutouts 27 allow that the vibration isolating insert 1 can be bent (cf. FIG. 2) to conform to the (circular or semi-circular) shape of the pipe clip body 5.

Between the two longitudinal ribs 26 there are a number of longitudinal ribs 32 made of the softer lining material. In the example of FIGS. 1-3 there are two of such ribs 32 but this can be a different number. In the specific embodiment shown also these intermediate ribs 32 have transverse cutouts 33 to facilitate bending of the strip 1, but as the material of the intermediate ribs 32 is softer and less rigid than the material of the outer ribs 26, the provision of cutouts 33 in the softer ribs 32 is less imminent.

In a unloaded state of the vibration isolating insert 1 the longitudinal ribs 26 on the reinforcing member 25 are higher than the intermediate ribs 32 as can be best seen in FIG. 3.

Figure 4:
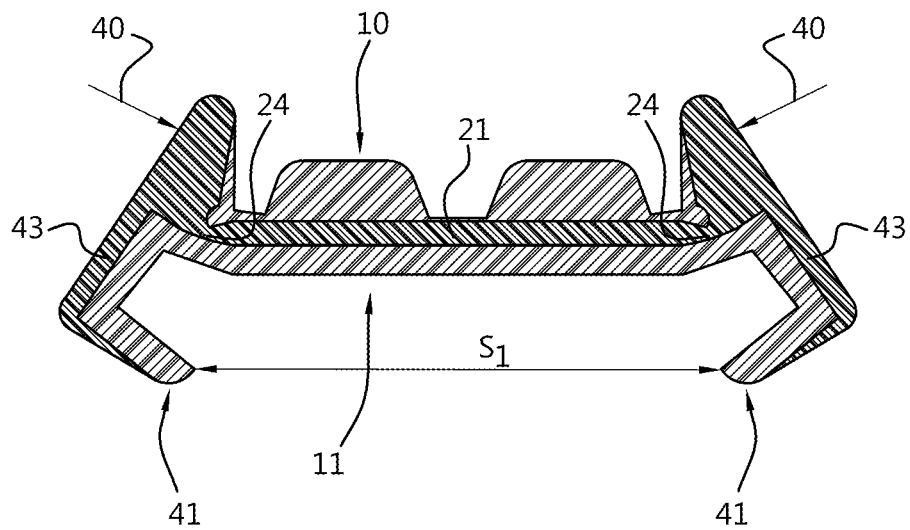
FIG. 4 shows a cross sectional view of the vibration isolating insert of FIG. 1 in which longitudinal ribs are pinched together.
Figure 5:
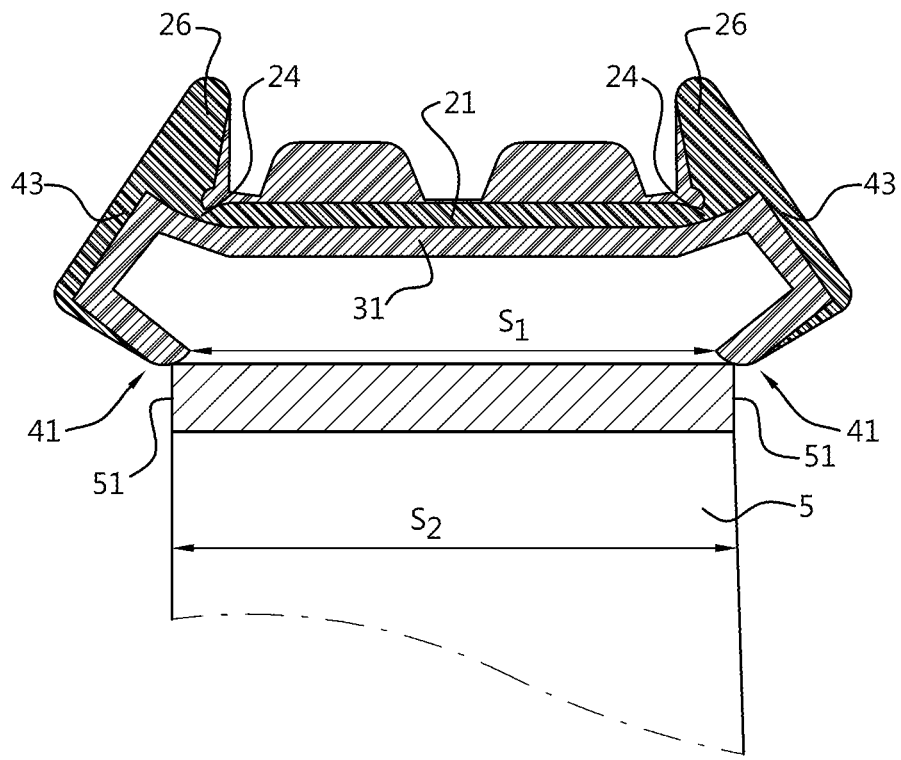
FIG. 5 shows the fitting of the insert of FIG. 4 on a pipe clip body.

The longitudinal ribs 26 have a function during the arrangement of the vibration isolating insert 1 in a pipe clip body: The longitudinal rib 26 acts as a lever arm which can be pushed inwards which is depicted in FIG. 4 by force arrow 40. In practice a fitter may for example pinch the ribs 26 together. By the inwardly directed force on the ribs 26 the gripping formations 25 pivot around the hinge 24, while the web 21 remains substantially flat and straight. Thereby the gripping formations 4 swivel outwards as can be seen in FIG. 4. The gripping formations 4 can swivel outwards far enough such that the distance S1 between the extremities of the gripping formations exceeds the width S2 of the pipe clip body 5 (S1>S2) whereby the pipe clip body 5 fits between the flanges 41 of the gripping formations 4 and the pipe clip body 5 can be arranged against the lining 31 on the web 21. When the force 40 is removed the insert 1 will return to its unloaded state (cf. FIG. 3) in which S1<S2. The insert 1 will return to the unloaded state by the resiliency of the material of the framework 2 and of the vibration isolating lining 3, and the gripping formations 4 will grip around the lateral edges 51 of the pipe clip body 5.

Figure 6:
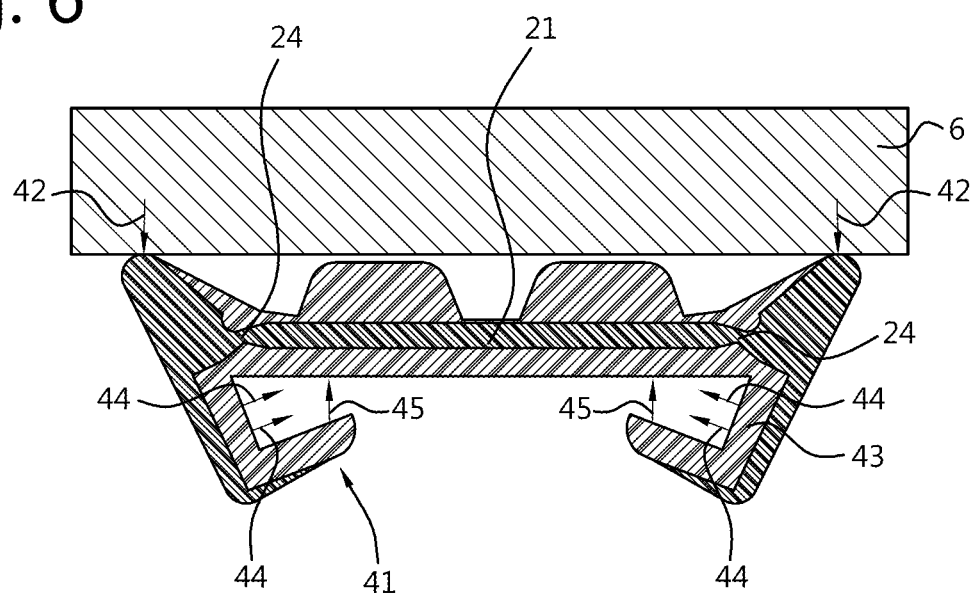
FIG. 6 shows a cross sectional view of the vibration isolating insert of FIG. 1 in a state in which it is pressed against a pipe surface.

In the state in which the strip 1 is arranged in the pipe clip body 5 and the pipe clip is installed around a pipe and is subsequently tightened, the pipe surface puts a pressure on the outer ribs 26, because these ribs 26 stand out above the intermediate ribs 32. The pipe surface is depicted schematically in FIG. 6 and indicated by reference numeral 6. The pressure force is indicated by arrows with reference numerals 42. The point of application of the pressure force 42 is located more on the inner side of the rib 26, whereby the rib 26 is forced outwardly as is shown in FIG. 6. Because the rib 26 works as a lever, the lateral reinforcement member 25 pivots around the hinge 24 whereby the gripping formations 4 are forced inwardly. As a result the legs 43 of the gripping formations 4 will be pressed towards and against the lateral edges of the pipe clip body 5 as is illustrated by the arrows indicated by reference numeral 44. Furthermore the flanges 41 are pressed toward and against an outer side of the annular pipe clip body 5 as is illustrated by the arrows indicated by reference numeral 45. The holding force of the vibration isolating insert 1 on the pipe clip body 5 will increase.

If the ribs 26 swivel sufficiently outwardly, the pipe surface 6 will eventually come into engagement with the intermediate ribs 32 of the vibration isolating insert 1. Because the intermediate ribs 32 are made of a softer and better isolating material, the pipe is held more tightly by the pipe clip and the vibration isolating effect of the vibration isolating insert 1 is enhanced.

The invention claimed is:

1. A vibration isolating insert for a pipe clip, the vibration isolating insert being adapted to be arranged on a substantially annular pipe clip body and ultimately—in use—to be positioned between the outer surface of a pipe and the pipe clip body, the vibration isolating insert comprising an elongate strip, said strip having a pipe facing side, which in use faces the outer surface of the pipe, and opposite thereto a pipe clip facing side, which in use faces an inner side of the pipe clip body, the vibration isolating insert furthermore comprising gripping formations connected to the strip at lateral side portions thereof and extending towards the pipe clip facing side and in use grip over the respective lateral edges of the pipe clip body, the vibration isolating insert comprising a framework and a vibration isolating lining made of a softer material different from the material of the framework, wherein the framework is a profiled section element formed of a polymeric material, said framework comprising a strip shaped web, that reinforces the elongate strip, and lateral reinforcing members connected to the web on either lateral side of the web and reinforcing the gripping formations, and wherein the framework furthermore comprises at least one living hinge defining a pivot axis parallel to the longitudinal axis of the insert and allowing at least one of the gripping formations to swivel around said pivot axis to increase and decrease the distance between the gripping formations during arrangement of the insert on a pipe clip body.

2. The vibration isolating insert according to claim 1, wherein the lateral reinforcing members are each pivotably connected to the web by living hinges formed at the lateral sides of the web.

3. The vibration isolating insert according to claim 1, wherein the vibration isolating lining is made of a polymeric material that is softer than the polymeric material of which the framework is made.

4. The vibration isolating insert according to claim 1, wherein the framework is made of an elastomer.

5. The vibration isolating insert according to claim 1, wherein the framework is made of a PVC.

6. The vibration isolating insert according to claim 1, wherein the vibration isolating lining is made of an elastomer.

7. The vibration isolating insert according to claim 1, wherein the framework comprises a longitudinal rib formed on the pipe facing side of each lateral reinforcing member.

8. The vibration isolating insert according to claim 7, wherein one or more longitudinal intermediate ribs made of the softer lining material are formed on the pipe facing side of the strip between the longitudinal ribs on the lateral reinforcing members.

9. The vibration isolating insert according to claim 8, wherein the intermediate ribs have a height smaller than the ribs on the lateral reinforcing members.

10. The vibration isolating insert according to claim 1, wherein the pipe clip facing side of the framework is entirely covered with the softer lining material.

11. A method for manufacturing a vibration isolating insert according to claim 1, wherein the insert is made by extrusion of a profile, wherein the framework and the lining are co-extruded from two different polymeric materials, and wherein the extruded profile is cut to length to fit in the pipe clip body.

* * * * *